(12) United States Patent
Hubrich et al.

(10) Patent No.: US 7,693,218 B2
(45) Date of Patent: Apr. 6, 2010

(54) MOTION VECTOR ESTIMATION WITH IMPROVED MOTION VECTOR SELECTION

(75) Inventors: Ralf Hubrich, Weiterstadt-Gräfenhausen (DE); Michael Eckhardt, Wiesbaden (DE)

(73) Assignee: Panasonic Corporation, Osaka (JP)

( * ) Notice: Subject to any disclaimer, the term of this patent is extended or adjusted under 35 U.S.C. 154(b) by 1400 days.

(21) Appl. No.: 11/099,571

(22) Filed: Apr. 6, 2005

(65) Prior Publication Data

US 2005/0243929 A1 Nov. 3, 2005

(30) Foreign Application Priority Data

Apr. 30, 2004 (EP) .................................. 04010298

(51) Int. Cl.
*H04N 7/12* (2006.01)
*G06K 9/36* (2006.01)

(52) U.S. Cl. .................................. 375/240.16; 382/236

(58) Field of Classification Search ................ 348/699, 348/452, 429, 97, 526, 558, 700, 446, 448, 348/451; 382/107, 236, 232, 239, 238; 375/240.16, 375/240.12, 240.24, 240.14, 240.15, 240
See application file for complete search history.

(56) References Cited

U.S. PATENT DOCUMENTS

| | | | |
|---|---|---|---|
| 5,687,097 A | | 11/1997 | Mizusawa et al. |
| 5,929,919 A | * | 7/1999 | De Haan et al. ............. 348/452 |
| 6,061,401 A | * | 5/2000 | Jung ........................... 375/240 |
| 6,240,211 B1 | * | 5/2001 | Mancuso et al. ............ 382/236 |
| 6,385,245 B1 | | 5/2002 | De Haan et al. |
| 7,061,981 B2 | * | 6/2006 | Takahashi et al. ....... 375/240.16 |
| 2001/0014124 A1 | | 8/2001 | Nishikawa |
| 2002/0126760 A1 | | 9/2002 | Schutten et al. |
| 2008/0043839 A1 | * | 2/2008 | Kitamura ............... 375/240.05 |

FOREIGN PATENT DOCUMENTS

| | | |
|---|---|---|
| WO | 99/16251 | 4/1999 |
| WO | 02/067576 | 8/2002 |

* cited by examiner

*Primary Examiner*—Behrooz Senfi
(74) *Attorney, Agent, or Firm*—Wenderoth, Lind & Ponack, L.L.P.

(57) ABSTRACT

The present invention provides an improved method for motion estimation. For this purpose, the prediction quality of a motion vector estimate is evaluated twice, namely by comparing the prediction quality with respect to the two previous fields individually and combining both calculated error values into a single error value for selecting the best motion vector estimate from a plurality of candidate vectors. In this manner, the determination of the real motion of an image object is improved by eliminating false estimates which are not detectable by only referencing a single previous image.

Figure 1:
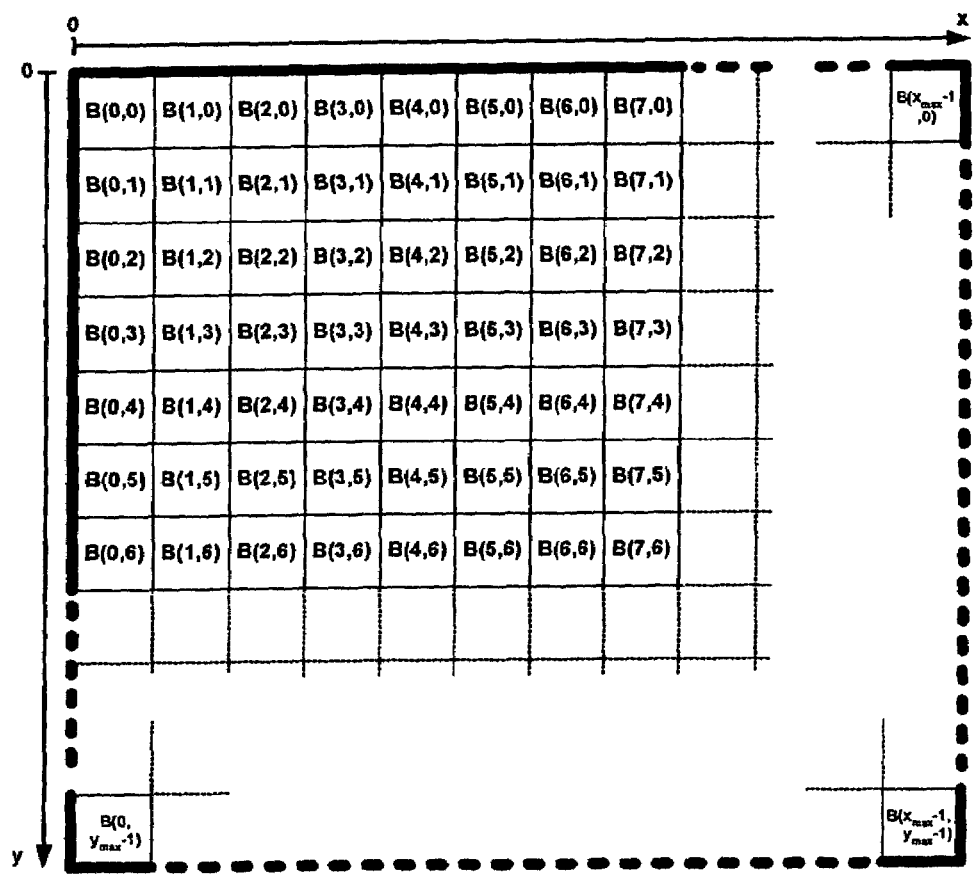

22 Claims, 6 Drawing Sheets field n-1      field n

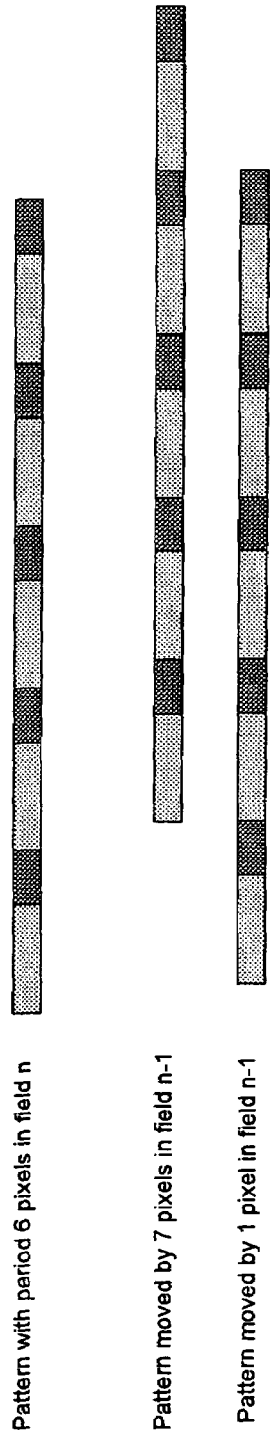
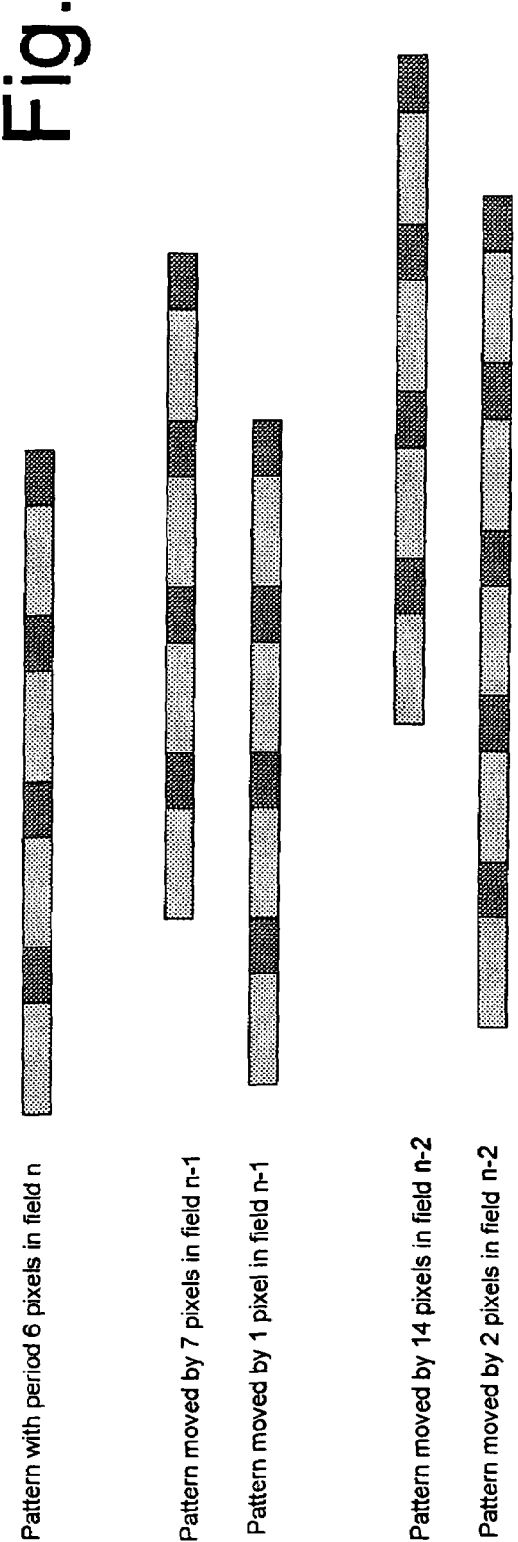

MOTION VECTOR ESTIMATION WITH IMPROVED MOTION VECTOR SELECTION

The present invention relates to an improved motion estimation. In particular, the present invention relates to a method for estimation of a motion vector between blocks of images in a video sequence and a corresponding motion estimator.

Motion estimation is employed in an increasing number of applications, in particular, in digital signal processing of modern television receivers. Specifically, modern television receivers perform a frame-rate conversion, especially in form of an up-conversion or motion compensated up-conversion, for increasing the picture quality of the reproduced images. Motion compensated up-conversion is performed, for instance, for video sequences having a field or frame frequency of 50 Hz to higher frequencies like 60 Hz, 66.67 Hz, 75 Hz, 100 Hz etc. While a 50 Hz input signal frequency mainly apply to television signals broadcast based on PAL or SECAM standard, NTSC based video signals have an input frequency of 60 Hz. A 60 Hz input video signal may be up-converted to higher frequencies like 72 Hz, 80 Hz, 90 Hz, 120 Hz etc.

During up-conversion, intermediate images are to be generated which reflect the video content at positions in time which are not represented by the 50 Hz or 60 Hz input video sequence. For this purpose, the motion of moving objects has to be taken into account in order to appropriately reflect the changes between subsequent images caused by the motion of objects. The motion of objects is calculated on a block basis, and motion compensation is performed based on the relative position in time of the newly generated image between the previous and subsequent images.

For motion vector determination, each image is divided into a plurality of blocks. Each block is subjected to motion estimation in order to detect a shift of an object from the previous image. A time consuming full search algorithm for detecting a best match block in the previous image within a predefined search range is preferably avoided by employing a plurality of predefined candidate vectors. The set of candidate vectors includes a number of predefined most likely motion vectors.

A motion vector is selected from the candidate vectors based on an error value calculated for each of the candidate vectors. This error function assesses the degree of conformity between the current block and the candidate block in the previous image selected in accordance with the respective candidate vector. The best matching vector having the smallest error function is selected as the motion vector of the current block. As a measure for the degree of similarity between the current and the previous block, the Sum of Absolute Differences (SAD) may be employed.

The set of predefined candidate vectors may include those motion vectors as candidate vectors which have already been determined for adjacent blocks of the current image, motion vectors which have been determined for blocks in the previous image at a similar position, etc.

The Article "An Efficient True-Motion Estimator Using Candidate Vectors from a Parametric Motion Model" from Gerard de Haan et al. in IEEE Transactions on Circuits and Systems for Video Technology, vol. 8, no. 1, February 1998, describes the calculation of a global motion vector as a candidate vector. The global motion vector reflects a common motion of all blocks of the image.

EP-A0 578 290 describes further candidate vectors which are based on the motion vectors of adjacent blocks of the current image. The length and direction of these vectors is modified by adding an update vector having a random magnitude. The selection of these type of vectors as motion vector of the current block can be controlled by adding predefined penalty values to the respective SAD. In accordance with the added penalty, the likelihood to be selected as the motion vector of the current block can be respectively reduced.

In addition to image interpolation, motion estimation is further employed during the encoding of video images in order to exploit temporal redundancies. For this purpose, a plurality of video encoding standards has been developed. In wide-spread use are the encoding standards denoted as H.26x or MPEG-x.

Up-conversion algorithms which are used in high-end television receivers suffer from estimation errors caused when either processing thin horizontal lines or periodic structures.

Motion vector estimation errors at horizontal lines result from the interlaced transmission constraints of video signals transmitted in accordance with the interlaced television standards PAL, SECAM or NTSC. In case of a thin horizontal line which is represented by two adjacent rows of pixels in a progressive image, this line is split into individual lines in an interlace video signal such that one of these two lines is part of a first field and the second line is part of the next field. A motion estimation algorithm will consequently detect subsequently upwards and downwards directed motion vectors as the lines of the subsequent fields appear to move repeatedly upwards from one field and downwards from the next field.

Another problem is caused by periodic structures in an input sequence. Upon determining a motion vector for a current block, the motion estimation algorithm will return with a plurality of different motion estimations which provide an equal estimation error, i.e. SAD value. Due to the equal estimation quality, the estimation algorithm may select any of these motion estimation, but is not in a position to determine the correct motion of this block.

For instance, a pattern, which has a periodic structure of a 6 pixel width, is assumed to move with a speed of 7 pixels per field. The correct motion estimation would return a motion vector representing a 7 pixel shift. However, motion vectors representing a shift of 1 pixel, −5 pixels, −12 pixels, or 13 pixels will also result in the same low error value. Such problems occur if the current block is completely located inside the moving image object having the periodic pattern.

If motion vectors cannot be determined which accurately reflect the correct motion of a moving object, strong artifacts become visibly in a motion compensated image, in particular at horizontal lines or periodic structures.

The present invention aims to improve motion estimation and to provide an improved method for determining a motion vector and an improved motion estimator.

This is achieved by the features of the independent claims.

According to a first aspect of the present invention, a method for determining a motion vector for a block of a current image in a sequence of video images is provided. Each video image is divided into a plurality of blocks. For determining a motion vector, the method provides different estimates for a motion vector of the current block. An error value is calculated for each of the motion vector estimates based on the current block and a block of a previous image referenced by the motion vector estimate. A further error value is calculated for at least one of the motion vector estimates based on the current block and a block in another previous image referenced in accordance with the motion vector estimate. If a film mode indication is received for the current image block only one of both calculated individual error values is taken for selecting the motion vector. Otherwise, the error values which are calculated based on a single motion vector estimate are combined into a single error value for the selecting step. That motion vector estimate is selected as motion vector of the current block which has the smallest error value.

According to another aspect of the present invention, a motion estimator for determining a motion vector for a block of a current image in a sequence of video images is provided. Each video image is divided into a plurality of blocks. The motion estimator comprises a candidate vector generator, a first and a second error calculator, a combiner, and a selector. The candidate vector generator provides different estimates for a motion vector of the current block. The first error calculator calculates an error value for each of the motion vector estimates based on the current block and a block of a previous image referenced by the motion vector estimate. The second error calculator calculates a further error value for at least one of the motion vector estimates based on the current block and a block in another previous image referenced in accordance with the motion vector estimate. If a film mode indication is received for the current image block the selector selects the motion vector on the basis of one of both calculated individual error values. Otherwise, the combiner combines the error values calculated based on a single motion vector estimate into a single error value. The selector selects that motion vector estimate as motion vector of the current block which has the smallest error value.

It is the particular approach of the present invention to avoid an incorrect selection of a motion vector from a plurality of candidate vectors. Generally, the selection of a motion vector is based on the smallest calculated error value. The present invention does not only employ a single error value calculated by referencing the previous image. A further error value is calculated by referencing another previous image wherein the motion vector length is adjusted accordingly. Both calculated error values which stem from the same motion vector estimate are combined and compared to the error values of other candidate vectors. In this manner, motion vectors which do not properly reflect the real motion of an image object can efficiently be "penalized" by increasing the calculated error value. Depending on the estimation quality, the second error value calculated for the same motion vector estimate introduces a higher error value for wrong motion vectors such that these vectors are unlikely to be selected as the motion vector for the current block.

This is achieved for horizontal lines as the additionally calculated error value for incorrect motion estimations is calculated by referencing an image portion which does not include a thin line such that the error value increases.

The true motion of a periodic pattern is accurately detected by employing an additional error value as all wrong motion vectors which result from only referencing a single image for the error value calculation are penalized when referencing a further image not matching the motion of the periodic pattern. Thus, the present invention enables to detect the true motion of an image object in a simple manner.

If film mode is detected at least two successive fields stem from the same original image. Thus, the previous field being closer in temporal respect to the current field has either the same motion phase as the current field or as the other previous field. Consequently, an error value based on the previous field which is temporally located closer to the current field would distort a combined single error value. In order to avoid such a distortion of the single error value, only that previous field being further away in temporal respect to the current image is used for calculating the error value.

Preferably, a mean value is calculated as a single error value based on the error values which are calculated for a single motion vector estimate. In this manner, the prediction quality with respect to two prior images is taken into account when selecting an appropriate motion vector for the current block.

According to a preferred embodiment, both error values are weighed by assigning different weighing factors to the error values before a mean value is calculated. In this manner, the impact of the second error value on the motion vector selection is adjustable.

Preferably, different weighing factors are applied to both calculated error values. By assigning a larger weighing factor to the error value which has been calculated based on that previous image being closer in temporal respect to the current image the different image types can be taken into account more appropriately. Motion of images comprising only irregular structures can be estimated more accurate using image data with a short temporal distance. On the other hand, a correct motion vector for periodical structures can be determined using two separate error values. With the described weighing factors of a different size, a single error value can be provided reflecting at the same time the needs for images containing irregular structures or periodical structures.

According to a particular preferred embodiment, the weighing factor assigned to the error value which is based on that previous image being closer in temporal respect to the current image is approximately $3/4$ and the weighing factor assigned to the other error value is approximately $1/4$. These particular weighing factors enable the provision of an optimum single error value reflecting at the same time the needs of different image types.

Preferably, at least one of a zero motion vector pointing to the block position of the current block, a motion vector which has already been determined for an adjacent block in the current image, a motion vector already determined for an adjacent block in the current image wherein the vector length is varied by adding an update vector, and a motion vector already determined for a block of a previous image are used as candidate vectors for selecting a motion vector for the current block. Based on the different estimation schemes, a motion vector for the current block can be determined with high efficiency and accuracy.

Preferably, the video sequence is an interlaced video sequence and the images referenced for calculating error values are the two fields positioned immediately prior to the current field.

According to another preferred embodiment, plural error values are calculated for all motion vector estimation schemes.

According to a further embodiment, at least a third error value for a single motion vector estimate is calculated by referencing a further previous image. In this manner, the applicability of the motion estimate for the current block can be verified with improved accuracy.

Preferred embodiments of the present invention are the subject matter of dependent claims.

Figure 2:
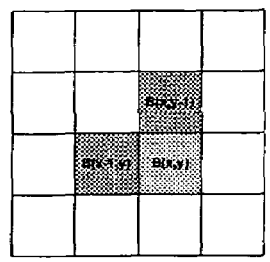
Figure 3:
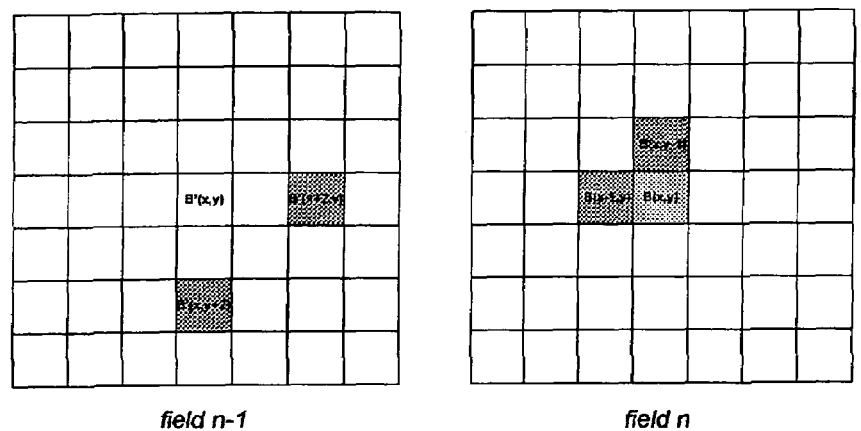
Figure 4:
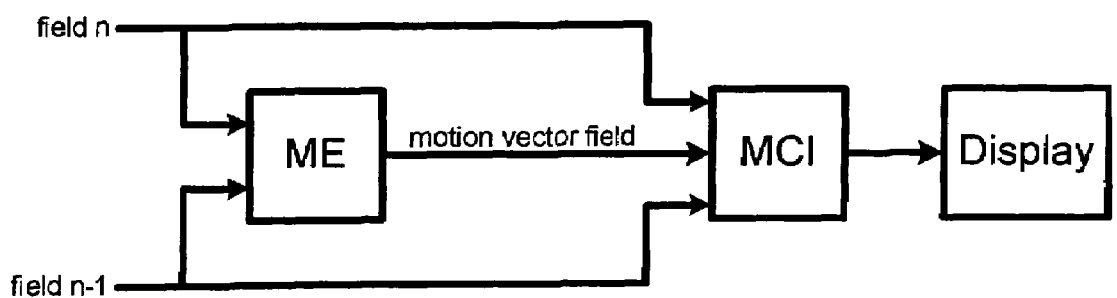
Figure 5:
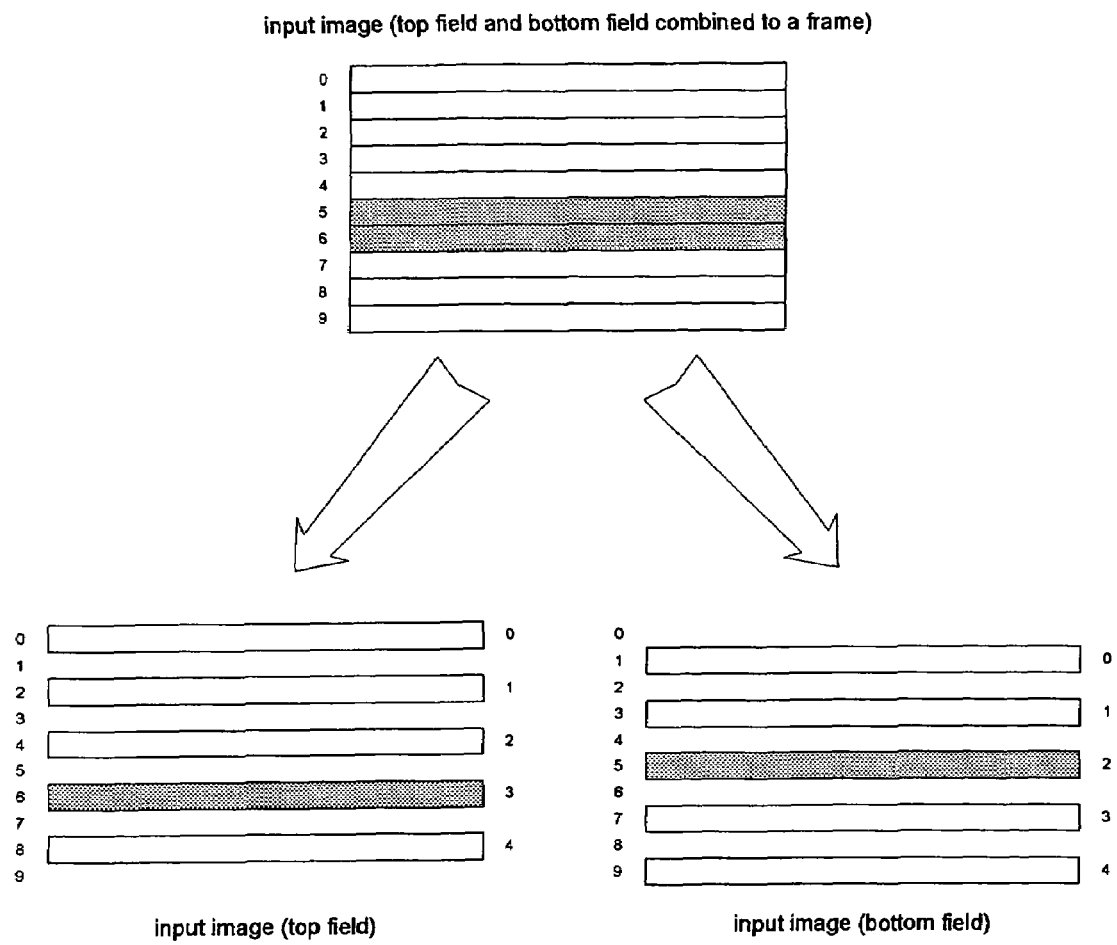
Figure 8:
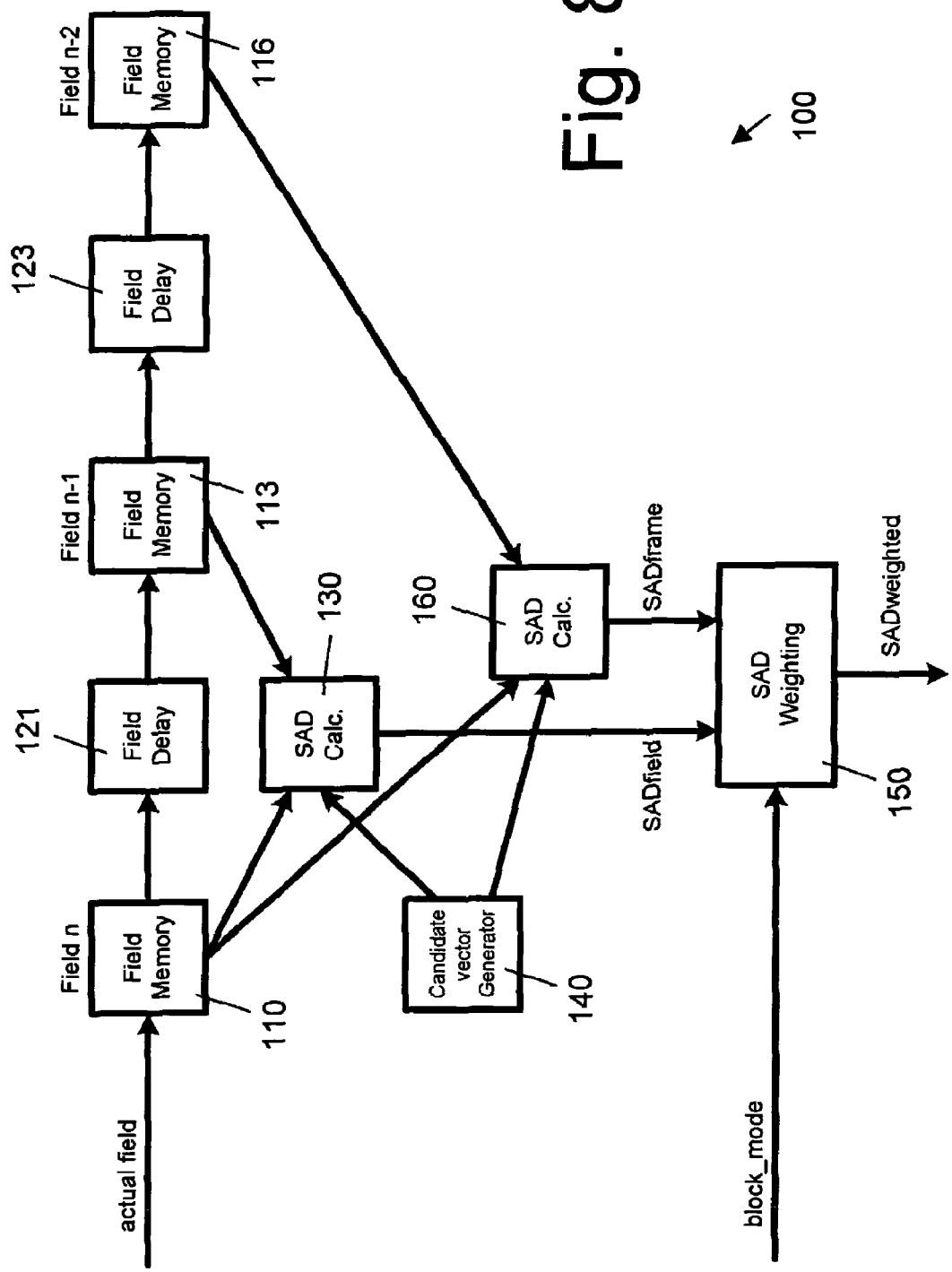
Figure 9:
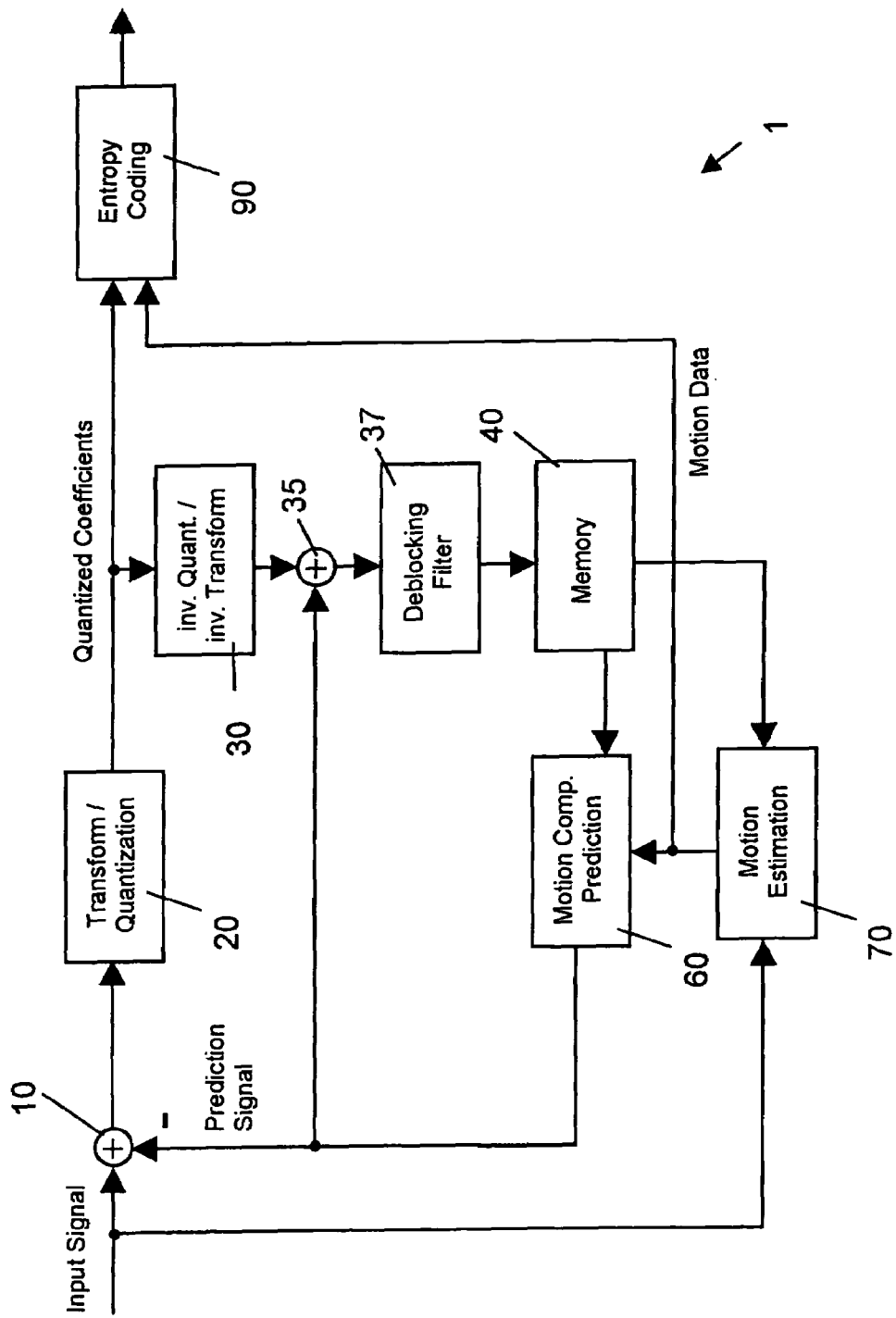

Other embodiments and advantages of the present invention will become more apparent from the following description of preferred embodiments, in which:

FIG. 1 illustrates a division of a video image into a plurality of blocks of a uniform size for motion estimation purposes, FIG. 2 illustrates an example of spatial prediction vectors, FIG. 3 illustrates an example of spatial and temporal prediction vectors, FIG. 4 illustrates an example configuration of a field rate converter, FIG. 5 illustrates an example of the representation of a thin horizontal line in an interlaced video sequence, FIG. 6 illustrates examples for predicting a periodic structure by different candidate vectors referencing a single previous field, FIG. 7 illustrates a prediction of a periodic structure by different candidate vectors wherein the prediction quality is evaluated by referencing two different previous fields, FIG. 8 illustrating an example configuration of a motion estimator in accordance with the present invention, and FIG. 9 illustrates an example configuration of a hybrid video encoder employing motion estimation.

The present invention relates to digital signal processing, especially to signal processing in modern television receivers. Modem television receivers employ up-conversion algorithms in order to increase the reproduced picture quality. For this purpose, intermediate images are to be generated from two subsequent images. For generating an intermediate image, the motion of moving objects has to be taken into account in order to appropriately adapt the object position to the point of time reflected by the interpolated image.

Motion estimation is performed on a block basis. For this purpose, each received image is divided into a plurality of blocks as illustrated, for example, in FIG. 1. Each current block is individually subjected to motion estimation by determining a best matching block in the previous image.

In order to avoid a time consuming full search within a predefined search area, only a limited set of candidate vectors are provided to the motion estimator. From these candidate vectors, the motion estimator selects that vector which can predict the current block from the respective block of the previous image with a minimum amount of deviations.

FIG. 1 illustrates the division of each video image into a plurality of blocks B(x,y). Each block has a width X and a height Y wherein X and Y represent the number of pixels in the line and column direction, respectively. The number of blocks per line or column can be calculated by employing the following formulas:

$$x_{max} = \text{Pixels per line}/X$$

$$y_{max} = \text{Pixels per column}/Y$$

For each of these blocks, a motion vector is calculated from a plurality of different candidate vectors. Conventionally, the set of candidate vectors includes for instance the following motion vectors:

$$C_1 = (0;0)$$

$$C_2 = \vec{v}[(x-1;y),n]$$

$$C_3 = \vec{v}[(x;y-1),n]$$

$$C_4 = \vec{v}[(x-1;y),n] + \vec{u}$$

$$C_5 = \vec{v}[(x;y-1),n] + \vec{u}$$

$$C_6 = \vec{v}[(x+2;y),n-1]$$

$$C_7 = \vec{v}[(x;y+2),n-1]$$

wherein n indicates the current field, n−1 indicates the previous field, and $\vec{u}$ represents the update vector.

As can be seen from the above equations, the candidate vectors may include a zero motion vector ($C_1$), motion vectors of adjacent blocks for a spatial prediction ($C_2, C_3$), and/or a motion vector of the previous image for a temporal prediction ($C_6, C_7$).

The spatial prediction can be improved by employing update vectors which are accumulated to the spatial prediction vectors $C_2$, $C_3$. In order to take small changes of the object motion compared to a selected candidate vector into account, an update vector is applied to a motion vector to create new candidate vectors $C_4$, $C_5$. Although in the above list of candidate vectors, the update vector $\vec{u}$ is only applied to candidate vectors $C_2$ and $C_3$, it may be applied in the same manner to any other candidate vector, for instance to candidate vectors $C_6$, $C_7$.

Although the temporal prediction vectors $C_6$ and $C_7$ of the above list define the use of candidate vectors having an offset of two blocks, any other offset may be employed instead of two, for instance zero, one, three, etc.

While the temporal prediction vectors have been described with respect to a current and previous image, the term "image" may either relate to fields of an interlaced video sequence or to frames of a progressive video sequence. Correspondingly, the generated intermediate images may be fields or frames depending on the type of video sequence.

Further, the above list of candidate vectors is neither completed nor requires the inclusion of all of the above mentioned candidate vectors. Any other set of candidate vectors may be employed yielding the determination of a best match motion vector for the current block.

For each candidate vector, a prediction error is calculated and evaluated in order to determine the best match motion vector. As a measure for the prediction error, the Sum of Absolute Differences (SAD) can be determined. That candidate vector is selected and is considered to represent best the motion of the block which has the smallest SAD.

As some of the motion vector candidates $C_1$ to $C_7$ may be preferred over other candidate vectors, a programmable "penalty" may be added to the determined SAD for individual candidates. In this manner, the selection of particular candidates can be prioritized. Preferably, the penalty value is proportional to the length of the update vector $\vec{u}$ for motion vector candidates $C_4$, $C_5$.

In addition to the above list of candidate vectors, a global motion vector may be further taken into account. A global motion vector represents motion applicable to all blocks of the video image. Such motion vectors appropriately apply to a camera pan.

An example of spatial prediction vectors is illustrated in FIG. 2. The already determined motion vectors for the adjacent blocks in horizontal and vertical direction in the current image n may advantageously be used as spatial prediction vectors in order to calculate the motion vector of the current block B(x,y). FIG. 2 illustrates the current block B(x,y) and two possible spatial prediction motion vectors from the current field n.

In addition, FIG. 3 illustrates possible temporal prediction vectors B'(x+2,y) and B'(x,y+2) from the previous field n−1. Although particular blocks have been illustrated in FIGS. 2 and 3 as temporal and spatial motion vector predictions, the skilled person is aware that any other offset from the position of the current block may be used.

A configuration for a field rate converter is illustrated in FIG. 4. Image data from the current field n and the previous field n−1 are applied to motion estimator ME and motion compensated interpolator MCI. Motion estimator ME calculates a motion vector field for the current image which is applied to motion compensated interpolator MCI. The motion compensated interpolator MCI generates therefrom new image data to be displayed on a display device.

The distribution of a thin line represented by two adjacent lines in a progressive image representation in a sequence of interlaced video images is illustrated in FIG. 5. The thin line has a height of two adjacent lines and does not move between subsequent frames. If the frame is split up into a top field and a bottom field, the single line is split up into two lines which are alternately displayed by the top and bottom field. This is caused by the reduced vertical resolution of fields compared to frames. While a PAL frame has a resolution of 576 lines, each field only comprises 288 lines. Accordingly, an NTSC frame of 480 lines is made up of two fields of 240 lines.

Due to the unsteady vertical position of the lines in consecutive fields, motion estimation referencing the previous field always detects a respective motion vector.

FIG. 6 illustrates a periodic structure of a 6 pixel width which moves with a speed of 7 pixels/field. When determining a motion vector for the motion of such a periodic structure, a selector may equally select one of the predictions which are in conformity with the periodic structure. For instance, a pattern moved by 7 pixels or by 1 pixel would result in the same low error value.

As long as the error value is calculated by evaluating the temporal prediction with reference to the previous field, there is no difference in the error value between the correct motion vector and other candidates that differ by the period of the periodic structure (i.e. 6 pixels in the example of FIG. 6). In determining a further error value for a motion vector candidate which does not appropriately reflect the object motion with respect to a further previous image, for instance with respect to field n−2, however, the incorrect motion can be detected. For this purpose, the present invention suggests to not only take the previous image into account when calculating an error value, but to take an additional previous image into account. The resulting different motion estimates are illustrated in FIG. 7.

An example configuration of the motion estimator in accordance with the present invention is illustrated in FIG. 8. The current input field n is stored in an input field memory 110 and, twice delayed by delay means 121, 123 for a period of one field, stored in additional field memories 113, 116. Two error values are calculated by SAD calculators 130, 160 in parallel using the same candidate vector. Accordingly, a first error value $SAD_{field}$ is calculated by the first error calculator 130 based on the image data of field n and field n−1. A second error value $SAD_{frame}$ is calculated by second error calculator 160 using image data from field n and field n−2. Both error values are supplied to a weighing unit 150 in order to calculate a single error value $SAD_{weighted}$ which is used in order to determine the current motion vector from a plurality of candidate vectors $C_1$-$C_7$ provided by candidate vector generator 140.

The weighing unit 150 is assigning weighing factors to the calculated error values $SAD_{field}$ and $SAD_{frame}$. An averaged single error value from the two individual error values $SAD_{field}$ and $SAD_{frame}$ can be calculated by assigning the same weighing factor of appoximately 0.5 to both error values.

However, according to another embodiment, different weighing factors are applied to both calculated error values. A larger weighing factor is assigned to the error value $SAD_{field}$ which is calculated based on the previous image being closer in temporal respect to the current image. Thus, different image types can be considered more appropriately. While motion of images comprising irregular structures can be determined more accurate with an error value based on image data with a short temporal distance, a motion vector for a periodical structure is determined correctly using two separate error values. As tests have shown, an optimum single error value reflecting at the same time the needs of the different image types can be obtained by assigning a weighting factor of 0.75 to $SAD_{field}$ and a weighting factor of 0.25 to $SAD_{frame}$.

Error value combiner 150 further receives a block mode or field mode signal which is taken into account during the weighing process indicating the weighing factors assigned to both calculated error values $SAD_{field}$ and $SAD_{frame}$. The block mode signal may indicate particular motion phases of the referenced image data. In this manner, a particular motion phase structure may be taken into account when combining both error values. For instance, the block mode signal can indicate whether or not the referenced image data relate to the identical or to different motion phases and assign the weighing factors accordingly.

In accordance with a detected film mode or video mode of the input video sequence, the weighing process is controlled such that a repetition of a current motion phase during film mode is appropriately taken into account during the weighing process by error value combiner 150. If film mode is detected only the $SAD_{frame}$ is used and passed to the output of error value combiner 150 as $SAD_{weighted}$. This is done because field n−1 has the same motion phase as field n or field n−1 has the same motion phase as field n−2 and so the $SAD_{field}$ value would distort the resulting SAD.

The skilled person is aware that the source mode information may be either used on a field or block basis. Both variants result in good estimation results for video mode and film mode source material. However, in mixed mode, a block based mode detection would provide better estimation results.

For all candidate vectors, an error value—preferably the Sum of Absolute Differences (SAD)—is calculated twice for each candidate vector $C_1$-$C_7$. When calculating a second error value between field n and field n−2, the lengths of the motion vectors are adapted accordingly, i.e. the lengths of the motion vectors are doubled compared to the motion vectors used for field n−1.

The selector (not shown in FIG. 8) selects that motion vector estimate having the lowest error value $SAD_{weighted}$.

The candidate vectors $C_1$ to $C_7$ may be calculated in a different manner compared to the above described estimation approaches. The above-mentioned number and estimation schemes only represent preferred examples thereof.

Further, the weighing function for the combination of separate error values into a single error value $SAD_{weighted}$ can be further modified by adding so-called "penalty values". For instance, the above-mentioned motion vector estimates $C_4$ and $C_5$ may be penalized by adding a value to the error value which is proportional to the length of the update vector u.

Further, the present invention may be used not only for up-conversion algorithms but also for standard conversions of television receiver input signals and motion estimation employed for video compression.

While the present invention has been previously described mainly in the context of interpolation of intermediate images, in particular, for field- or frame-rate conversion in modern television receivers, the improved motion estimation of the present invention may be applied in a corresponding manner to video data compression.

The compression of video data generally employs a number of main stages (see FIG. 9). Each individual image is divided into blocks of pixels in order to subject each image to a data compression at a block level. Such a block division may correspond to the division shown in FIG. 1. Spatial redundancies within an image are reduced by applying each block to a transform in order to transform the pixels of each block from the spatial domain into the frequency domain. The resulting transform coefficients are quantized, and the quantized transform coefficients are subjected to entropy coding.

Further, temporal dependencies between blocks of subsequent images are exploited in order to only transmit differences between subsequent images. This is accomplished by employing a motion estimation/compensation technique. The exploiting of temporal dependencies is performed by so-called hybrid coding techniques which combine temporal and spatial compression techniques together with statistical coding.

Referring to FIG. 9, an example of a hybrid video encoder is illustrated. The video encoder, generally denoted by reference number 1, comprises a subtractor 10 for determining differences between a current video image and a prediction signal of the current image which is based on a motion compensated previously encoded image. A transform and quantization unit 20 transforms the prediction error from the spatial domain into the frequency domain and quantizes the obtained transformed coefficients. An entropy encoding unit 90 entropy encodes the quantized transform coefficients.

Encoder 1 employs a Differential Pulse Code Modulation (DPCM) which only transmits differences between subsequent images of an input video sequence. These differences are determined by subtractor 10 which receives the video images to be encoded and a prediction signal to be subtracted therefrom.

The prediction signal is based on the decoding result of previously encoded images on the encoder site. This is accomplished by a decoding unit incorporated into the video encoder. The decoding unit performs the encoding steps in reverse manner. Inverse quantization and inverse transform unit 30 dequantizes the quantized coefficients and applies an inverse transform to the dequantized coefficients. Adder 35 accumulates the decoded differences and the prediction signal.

The prediction signal results from an estimation of motion between current and previous fields or frames. The motion estimation is performed by a motion estimator 70 receiving the current input signal and the locally decoded images. Motion estimation is preferably performed in accordance with the present invention. Based on the results of motion estimation, motion compensation is performed by motion compensator 60.

Summarizing, the present invention provides an improved method for motion estimation. For this purpose, the prediction quality of a motion vector estimate is evaluated twice, namely by comparing the prediction quality with respect to the two previous fields individually and combining both calculated error values into a single error value for selecting the best motion vector estimate from a plurality of candidate vectors. In this manner, the determination of the real motion of an image object is improved by eliminating false estimates which are not detectable by only referencing a single previous image.

The invention claimed is:

1. A method for a digital video signal processor for determining a motion vector for a current block of a current video image in a sequence of video images, each of the video images being divided into a plurality of blocks, the method comprising the steps of:
   providing, using a candidate vector generator, a plurality of candidate motion vectors, each of the candidate motion vectors indicating an estimate of the motion vector of the current block of the current video image;
   calculating, for each of the candidate motion vectors, a first error value based on the current block of the current video image and a first block of a first previous video image preceding the current video image, the first block being referenced by the candidate motion vector;
   calculating, for each of the candidate motion vectors, a second error value based on the current block of the current video image and a second block of a second previous video image preceding the first previous video image, the second block being referenced by a vector having twice the length of the candidate motion vector;
   combining, for each of the candidate motion vectors, said first error value and said second error value into a third error value;
   receiving an indicator indicating whether the current block is in film mode or not; and
   determining the motion vector of the current block by selecting the candidate motion vector having the smallest second error value, if the indicator indicates that the current block is in film mode, and by selecting the candidate motion vector having the smallest third error value, if the indicator indicates that the current block is not in film mode.

2. A method according to claim 1, wherein said first and second error values are combined by calculating a mean value.

3. A method according to claim 1, wherein said first and second error values are combined by calculating a weighted mean value.

4. A method according to claim 3, wherein a weighting factor assigned to said first error value is larger than a weighting factor assigned to said second error value.

5. A method according to claim 4, wherein the weighting factor assigned to said first error value is approximately ¾ and the weighting factor assigned to the second error value is approximately ¼.

6. A method according to claim 1, wherein said candidate motion vectors are obtained on the basis of at least one of the following prediction schemes:
   a motion vector estimate pointing to the block position of the current block, a motion vector estimate corresponding to a motion vector already determined for an adjacent block in the current video image, a motion vector estimate corresponding to a motion vector already determined for an adjacent block in the current video image wherein the vector length has been varied by adding an update vector, and a motion vector estimate corresponding to a motion vector already determined for a block of a previous video image.

7. A method according to claim 1, wherein said first and second error values are calculated by accumulating absolute pixel differences between the current block and the first and the second block, respectively.

8. A method according to claim 1, wherein said sequence of video images is an interlaced video sequence.

9. A method according to claim 8, wherein said first previous video image is the field immediately prior to said current video image, and said second previous video image is the field immediately prior to the first previous video image.

10. A method for encoding a sequence of video images including a motion estimation method in accordance with claim 1.

11. A method for interpolating a sequence of video images including motion compensation employing a motion estimation method in accordance with claim 1.

12. A motion estimator for determining a motion vector for a block of a current video image in a sequence of video images, each of the video images being divided into a plurality of blocks, said motion estimator comprising:

a candidate vector generator providing a plurality of candidate motion vectors, each of the candidate motion vectors indicating an estimate of the motion vector of the current block of the current video image;

a first error value calculator for calculating, for each of the candidate motion vectors, a first error value based on the current block of the current video image and a first block of a first previous video image preceding the current image, the first block being referenced by the candidate motion vector;

a second error value calculator for calculating, for each of the candidate motion vectors, a second error value based on the current block of the current video image and a second block of a second previous video image preceding the first previous video image, the second block being referenced by a vector having twice the length of the candidate motion vector;

a combiner for combining, for each of the candidate motion vectors, said first error value and said second error value into a third error value, said combiner receiving an indicator indicating whether the current block is in film mode or not; and a selector for determining the motion vector of the current block by selecting the candidate motion vector having the smallest second error value, if the indicator indicates that the current block is in film mode, and by selecting the candidate motion vector having the smallest third error value, if the indicator indicates that the current block is not in film mode.

13. A motion estimator according to claim 12, wherein said combiner is adapted for calculating a mean value based on said first and second error values.

14. A motion estimator according to claim 12, wherein said combiner is adapted for calculating a weighted mean value based on said first and second error values.

15. A motion estimator according to claim 14, wherein a weighting factor assigned to said first error value is larger than a weighting factor assigned to said second error value.

16. A motion estimator according to claim 15, wherein the weighting factor assigned to said first error value is approximately $3/4$ and the weighting factor assigned to the second error value is approximately $1/4$.

17. A motion estimator according to claim 12, wherein said candidate vector generator generates said candidate motion vectors on the basis of at least one of the following prediction schemes:

a motion vector estimate pointing to the block position of the current block, a motion vector estimate corresponding to a motion vector already determined for an adjacent block in the current video image, a motion vector estimate corresponding to a motion vector already determined for an adjacent block in the current video image wherein the vector length has been varied by adding an update vector, and a motion vector estimate corresponding to a motion vector already determined for a block of a previous video image.

18. A motion estimator according to claim 12, wherein said first and second error value calculators calculate said first and second error values by accumulating absolute pixel differences between the current block and the first and the second block, respectively.

19. A motion estimator according to claim 12, wherein said sequence of video images is an interlaced video sequence.

20. A motion estimator according to claim 19, wherein said first previous video image is the field immediately prior to said current image, and said second previous video image is the field immediately prior to the first previous video image.

21. An encoder for encoding a sequence of video images including a motion estimator in accordance with claim 12.

22. An interpolator for interpolating a sequence of video images including motion compensation employing a motion estimator in accordance with claim 12.

* * * * *